US006963868B2

(12) United States Patent
Basso et al.

(10) Patent No.: US 6,963,868 B2
(45) Date of Patent: Nov. 8, 2005

(54) MULTI-BIT PATRICIA TREES

(75) Inventors: Claude Basso, Raleigh, NC (US); Jean L. Calvignac, Cary, NC (US); Gordon T. Davis, Chapel Hill, NC (US); Marco Heddes, Shelton, CT (US); Piyush C. Patel, Cary, NC (US); Steven R. Perrin, Raleigh, NC (US); Grayson W. Randall, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 10/448,528

(22) Filed: May 30, 2003

(65) Prior Publication Data

US 2004/0015494 A1 Jan. 22, 2004

Related U.S. Application Data

(60) Provisional application No. 60/384,978, filed on Jun. 3, 2002.

(51) Int. Cl.$^7$ .............................................. G06F 17/30
(52) U.S. Cl. ...................................................... 707/3
(58) Field of Search ..................... 707/1–10, 100–205; 700/11; 702/119; 370/389; 710/1; 714/733, 742; 716/1, 3, 18

(56) References Cited

U.S. PATENT DOCUMENTS

| | | | | |
|---|---|---|---|---|
| 5,173,906 A | * | 12/1992 | Dreibelbis et al. | 714/733 |
| 5,493,689 A | * | 2/1996 | Waclawsky et al. | 710/1 |
| 5,506,846 A | | 4/1996 | Edem et al. | 370/396 |
| 5,717,632 A | | 2/1998 | Richart et al. | 365/185.2 |
| 5,845,234 A | * | 12/1998 | Testa et al. | 702/119 |
| 6,052,683 A | | 4/2000 | Irwin | 707/8 |
| 6,061,712 A | | 5/2000 | Tzeng | 709/202 |
| 6,067,574 A | | 5/2000 | Tzeng | 709/247 |
| 6,223,172 B1 | | 4/2001 | Hunter et al. | 707/3 |
| 6,237,061 B1 | | 5/2001 | Srinivasan et al. | 711/108 |
| 6,675,163 B1 | * | 1/2004 | Bass et al. | 707/6 |
| 6,848,086 B2 | * | 1/2005 | Teig et al. | 716/3 |
| 2004/0215609 A1 | * | 10/2004 | Takatsu et al. | 707/3 |

OTHER PUBLICATIONS

Szpankowski, Wojciech, Patricia tries again revisited, Oct. 1990, ACM Press, vol. 37, Issue 4, pp. 691–711.*

Paolo Ferragina et al., The string B–tree: a new data structure for string search in external memory and its applications, Mar. 1999 ACM Press, vol. 46, Issue 2, pp. 236–280.*

* cited by examiner

Primary Examiner—Diane D. Mizrahi
(74) Attorney, Agent, or Firm—William N. Hogg

(57) ABSTRACT

A tree structure and method to organize routing information for processing messages within a network, each message being associated with a search key of "n" bits. The processing determines where to send the message next. The structure has a direct table (DT) of $2^x$ entries for decoding the first "x" bits of the search key, and one or more pattern search control blocks (PSCB's), each having $2^m$ entries for decoding subsequent groups of "m" bits. Each PSCB entry and DT entry includes a pointer to data associated with a specific route, if at this point a specific routing table entry is a potential match to the search key or a pointer to a subsequent PSCB if the end of a search trail is not identified. Each PSCB entry DT entry also indicates that the search has been resolved to the end of the search trail.

14 Claims, 8 Drawing Sheets

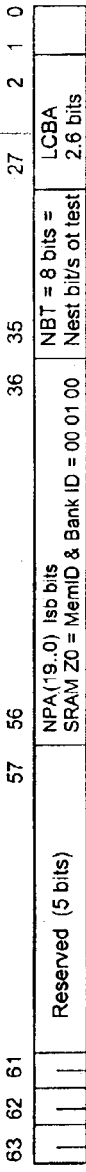
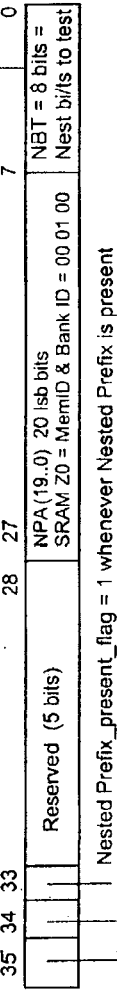
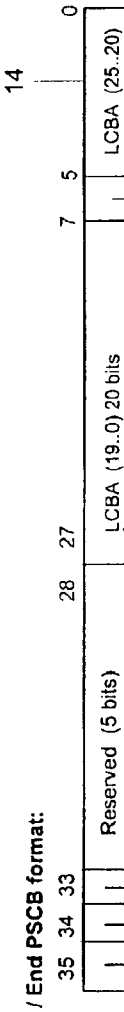
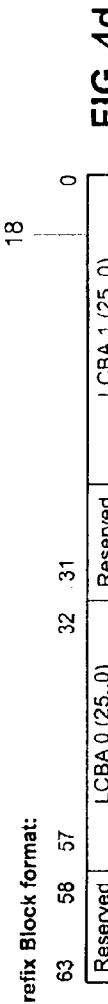
FIG. 4a
FIG. 4b
FIG. 4c
FIG. 4d

MULTI-BIT PATRICIA TREES

RELATED APPLICATIONS

This application claims the benefits of Provisional Application Ser. No. 60/384,978, filed Jun. 3, 2002, for MULTI-BIT PATRICIA TREES, which is incorporated herein by reference.

This application is related to application Ser. No. 09/543,531, filed Apr. 6, 2000, for FULL MATCH (FM) SEARCH ALGORITHM IMPLIMENTATION FOR A NETWORK PROCESSOR, which is incorporated herein by reference.

FIELD OF THE INVENTION

This invention relates to the structure of multi-bit trees and their use for organizing data associated with search keys constructed from selected fields of message packets and, more particularly, to a search process in which a direct table decode of the search key is used to index into a Patricia tree structure.

BACKGROUND OF THE INVENTION

FIG. 1 illustrates a conventional tree structure, as is well known in the prior art, for searching a data structure to match a table entry with a search key associated with a message packet to determine processing steps required to send the message packet to its destination. This example is specifically for a "Longest Prefix Match" lookup as is required for a routing table. The search is started by using the first "X" number of bits (in this case, 16 bits) of a search key of "n" number of bits to index into the direct table 10. Then a Patricia tree structure 12 (bits 16–23) is used to resolve collisions for multiple routes that share the same entry in the direct table by the use of Pattern Search Control Blocks 14. Each Pattern Search Control Block 14 (PSCB) is configured to test one of the remaining untested bits in the search key (IP address). Each PSCB decodes one bit to a "0" or a "1". Note that each PSCB in the path to the route represents a memory access required to complete the search. Thus, one obvious limitation of this approach is the latency of the search which is dominated by these memory accesses. Memory bandwidth also becomes an issue. Eventually, this process will lead to a unique route required for routing packets with the current IP address to their destination. These routes are denoted in the figure with a circle enclosing an "R". Additional circles enclosing a "P" indicate routes that are prefixes of other routes. In these cases, the search must continue past the prefix in order to determine if a longer prefix route exists, but may return to the prefix if no better match is found for the current address.

In this application, different terms, including abbreviations and acronyms, are used. Table I listed below gives a definition of certain of the terms:

TABLE I

Terms (including abbreviations and acronyms)

| Term | Definition |
|---|---|
| NPA | Next PSCB address |
| NBT | Next bit to test |
| LCBA | Leaf control block address |
| Bird | Prefix of a prefix or nested prefix |
| Trail End Flag | End of search - entry points to a leaf |
| SRAM | Static random access memory |
| DRAM | Dynamic random access memory |

TABLE I-continued

Terms (including abbreviations and acronyms)

| Term | Definition |
|---|---|
| DT | Direct table |
| D . . . | DRAM identifier |
| Mem | Memory |
| LPM | Longest prefix match |
| PSCB | Pattern Search Control Block |

SUMMARY OF THE INVENTION

This invention comprises a structure for and method of routing a message. The structure includes a tree for organizing routing information to be used in processing messages within a network node, each message being associated with a search key "n" bits in length. The process includes a determination of where to send the message next in order to get the message closer to the desired destination. The structure includes a direct table comprised of $2^x$ entries for decoding the first "x" bits of the search key. A plurality of pattern search control blocks (PSCB's) is provided comprised of $2^m$ entries for decoding subsequent groups of "m" bits. Each PSCB entry and direct table entry includes a pointer to data associated with a specific route. If at this point a specific routing table entry is a potential match to said search key and the end of a search trail is identified, the search is complete. However, each said PSCB entry and direct table entry includes a pointer to a subsequent PSCB if the end of a search trail is not identified. The structure also includes a nested-prefix structure that matches the dimensions of the PSCB structure. The nested-prefix structure contains pointers to data associated with routes that are nested prefixes of other routes. A pointer to the same route data may also appear in one or more entries of the associated PSCB if the route encompasses multiple decodes of the "m" bits used to index the PSCB. Each PSCB entry and direct table entry also includes an indication that the search has been resolved to the end of the search trail. Means are provided to walk through the tree structure to a trail end; and means are provided to return search results.

The method includes sending the first "x" bits of said search key to said direct table for decoding. If said direct table decodes said first "x" bits to provide a search trail end route, then routing said message on said decoded routing; and if said direct table does not indicate a search trail end route, then sending successive "n" bits to successive PSCB groups until a positive end search trail route is indicated. The method includes storing the search trail information, and returning the search results.

Optionally, the method includes comparing the search results found at the end of the trail with the original search key. Also, preferably prefixes of prefixes are stored in a nested-prefix structure where appropriate. The method then includes backtracking to an appropriate entry in the nested-prefix structure if the step of comparing produces a miscompare.

DESCRIPTION OF THE DRAWINGS

FIGS. 4a, 4b, 4c and 4d represent the formats of bits stored in different blocks of Pattern Search Control Blocks (PSCBs) according to this invention;

DESCRIPTION OF THE PREFERRED EMBODIMENT(S)

Figure 1:
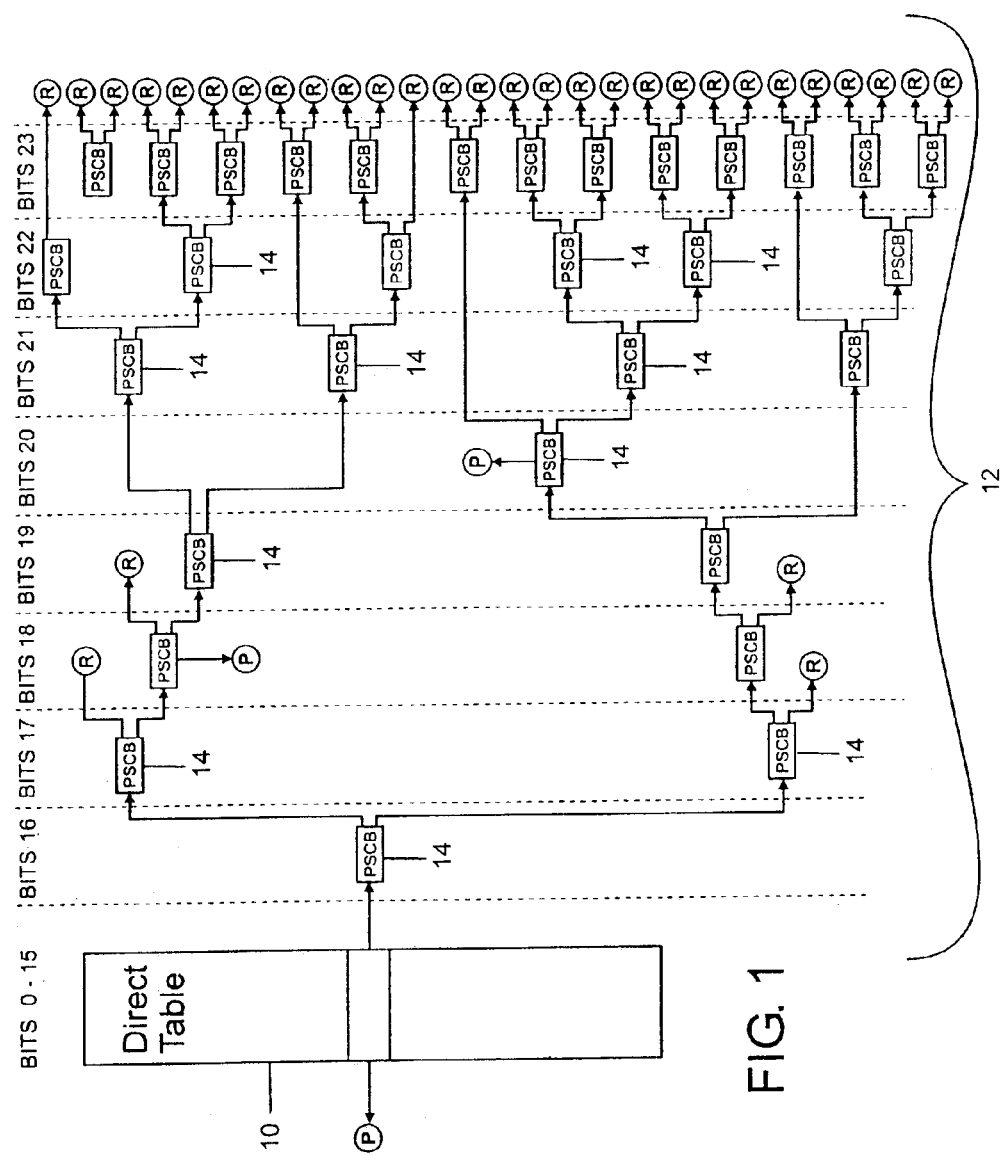
FIG. 1 is a high level drawing of the functional structure of a Patricia tree according to conventional prior art where, following the direct table, the tree decodes the bits in an address one bit at a time.

Referring now to the drawings, and for the present to FIG. 1, a diagram of the functional structure of a Patrcia tree according to a conventional prior art structure is shown. Such a structure was described in the background of the invention, and need not be described further. Suffice it to say that when walking the tree one bit at a time after decoding the first "x" (16) bits of "n" number of bits in the code requires memory accesses of one access per each bit after decoding in the direct table. Each memory access required increases latency of the search process.

Figure 2:
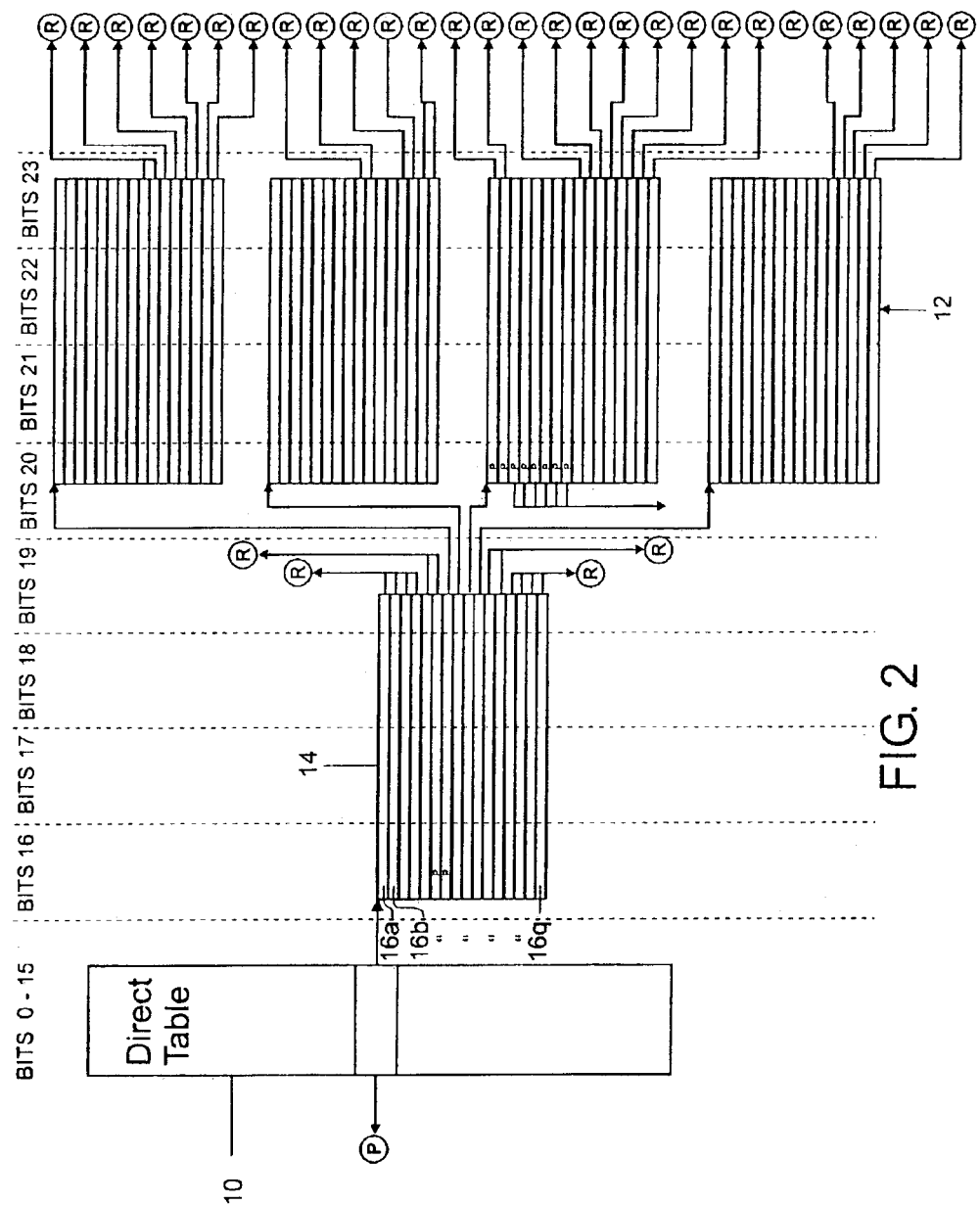
FIG. 2 is a high level drawing of the functional structure of one embodiment of a Patricia tree according to this invention.

A novel multi-bit tree structure for storing information in machines, such as Network Processors, is disclosed. FIG. 2 shows a graphical representation of the tree structure including a Direct Table 10 coupled to one or more multi-bit nodes termed Pattern Search Control Block 14 (PSCB). The multi-bit tree is used to decode a search key associated with each message to be sent. The search key is "n" bits long and the direct table decodes the first "x" number of bits in the search key. One typical number for "x" is 16 bits, which will be described herein. Each PSCB decodes "m" additional bits per iteration, preferably 4 bits resulting in 16 unique combinations 16a–16q.

The first "n" bits of a search key are used to identify a specific entry in the Direct Table. Thereafter, groups of "m" multiple (preferably 4) bits from the key are used to walk the structure associated with the entry. Routes of lengths divisible by four will use exactly one entry in the last PSCB in the search path to point to the actual routing data. Routes of other lengths may require multiple entries in the PSCB, all of which point to the same routing data. Only one direct table entry is shown pointing to a PSCB. It is to be understood, however, the there are actually many entries in the direct table, each of which may point to a different PSCB or directly to a route (or possibly both in the case of a nested-prefix). (The term "nested-prefix" is used synonymously with "prefix of a longer prefix".)

Figure 3:
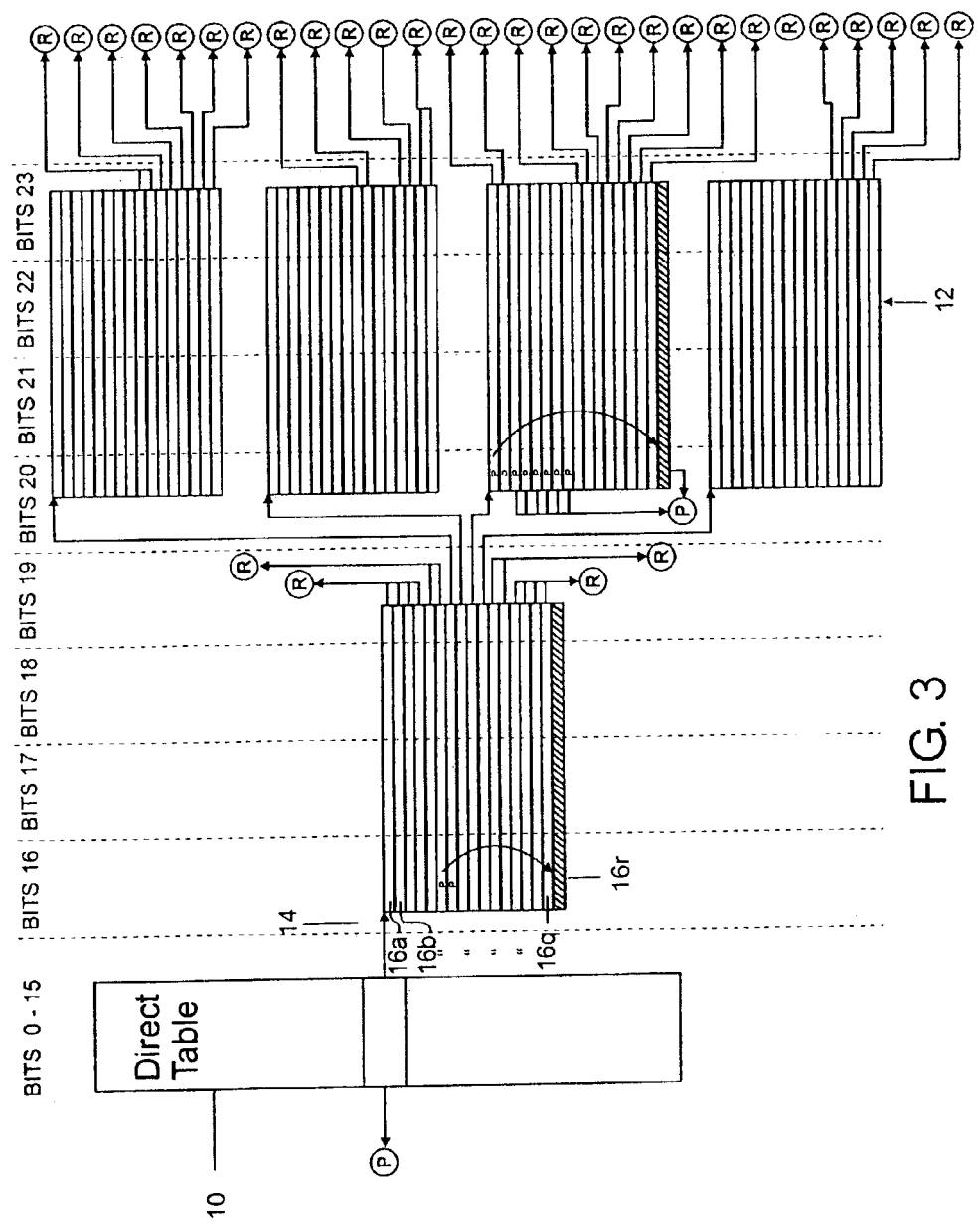
FIG. 3 is a high level drawing of the functional structure of another embodiment of a Patricia tree according to this invention.

FIG. 3 represents another embodiment of the tree structure in accordance with the subject invention. The PSCB structure 14 in this implementation includes 17 entries 16a–16r instead of 16 entries 16a–16q for each four bit PSCB. The extra entry is used to cache the most often used prefix of longer prefixes in order to avoid for that case the requirement of retrieving the prefix of prefix pointer from another (possibly slower) memory. A prefix of a prefix is a route pointer in a search trail with a prefix length less than the number "n" of bits that are needed to follow the PSCB pointer chain to the trail end. For example, if only 18 bits are needed to define a route, but the same 18 bit pattern plus 6 additional bits define another route with a 24 bit prefix, then the first PSCB would indicate the 18 bit route as a prefix of a prefix, but would also point to the longer prefix.

FIGS. 4a–4d illustrate the specific formats used for DT 10 and PSCB 14 entries. Note that, for the DT 10 format in FIG. 4a, an immediate field is available for the prefix of prefix pointer (LCBA), avoiding the requirement to access the other memory structure for 16 bit prefixes. This was done since 16 bit prefixes of other prefixes are relatively common, and having the immediate pointer enhances performance when encountering packets associated with these routes. FIG. 4b illustrates the PSCB 14 format used to point to the next PSCB 14 in the middle of a chain of pointers, while FIG. 4c illustrates the PSCB 14 format that points to route data at the end of a search trail. FIG. 4d illustrates the format of route data pointers in the nested-prefix structure 18 to be described below with reference to FIG. 7.

Figure 5:
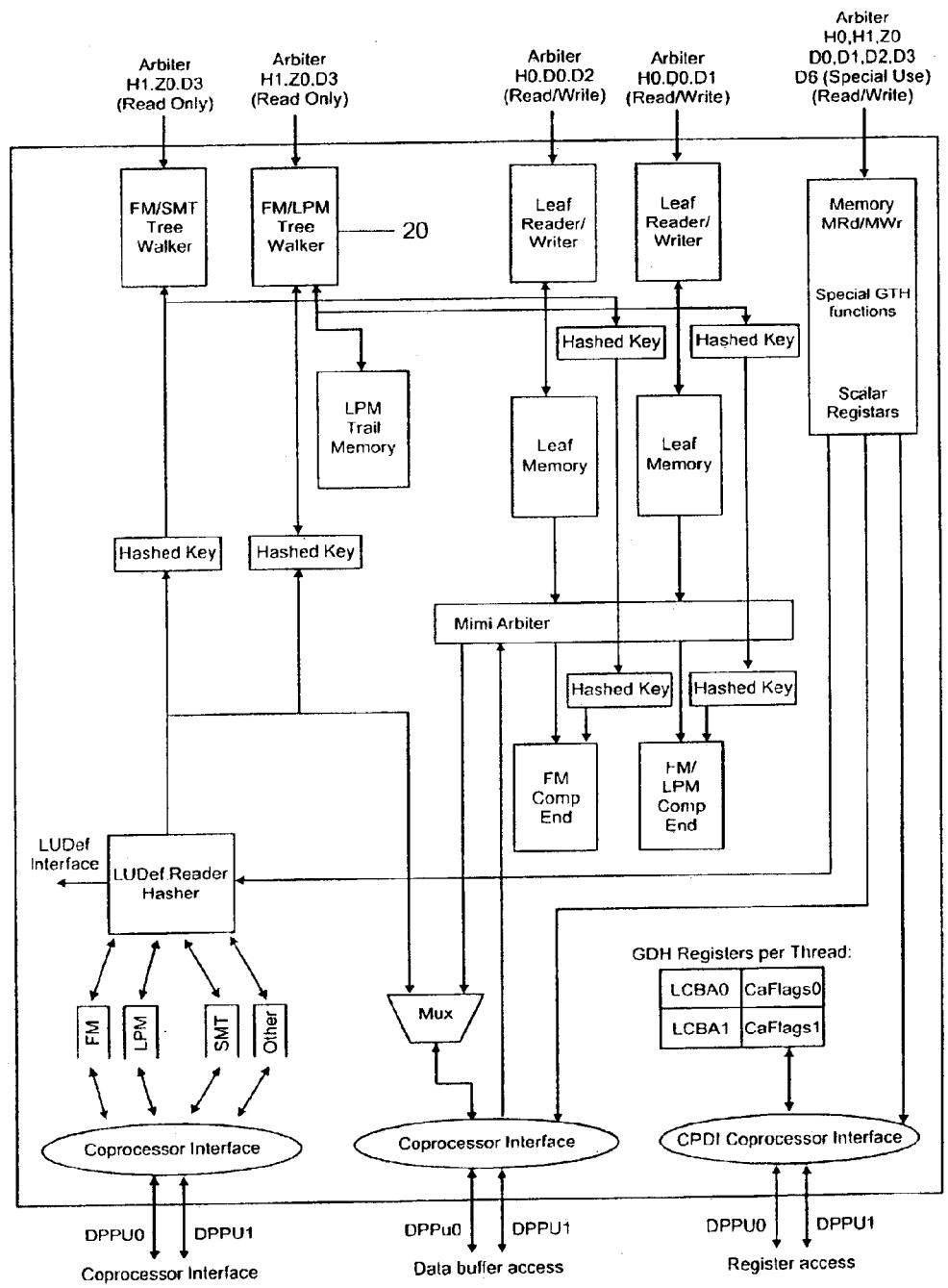
FIG. 5 is a diagram of the hardware implementation of the present invention.

FIG. 5 illustrates the hardware implementation of the tree search engine used to support search of the subject invention. The block labeled "FM/LPM Tree Walker" 20 includes state machines designed to follow the chain of PSCB pointers starting with the DT entry and ending with a pointer to the routing data at the end of the chain. This routing data pointer is subsequently passed to one of the blocks labeled Leaf Reader/Writer, where the desired data is retrieved, validated, and passed back to the requesting processor. This structure is conventional in the prior art for tree walking single bit Patricia trees, as described in application Ser. No. 09/543,531, except for a modification of the FM/LPM tree walker 20 described above.

Figure 6:
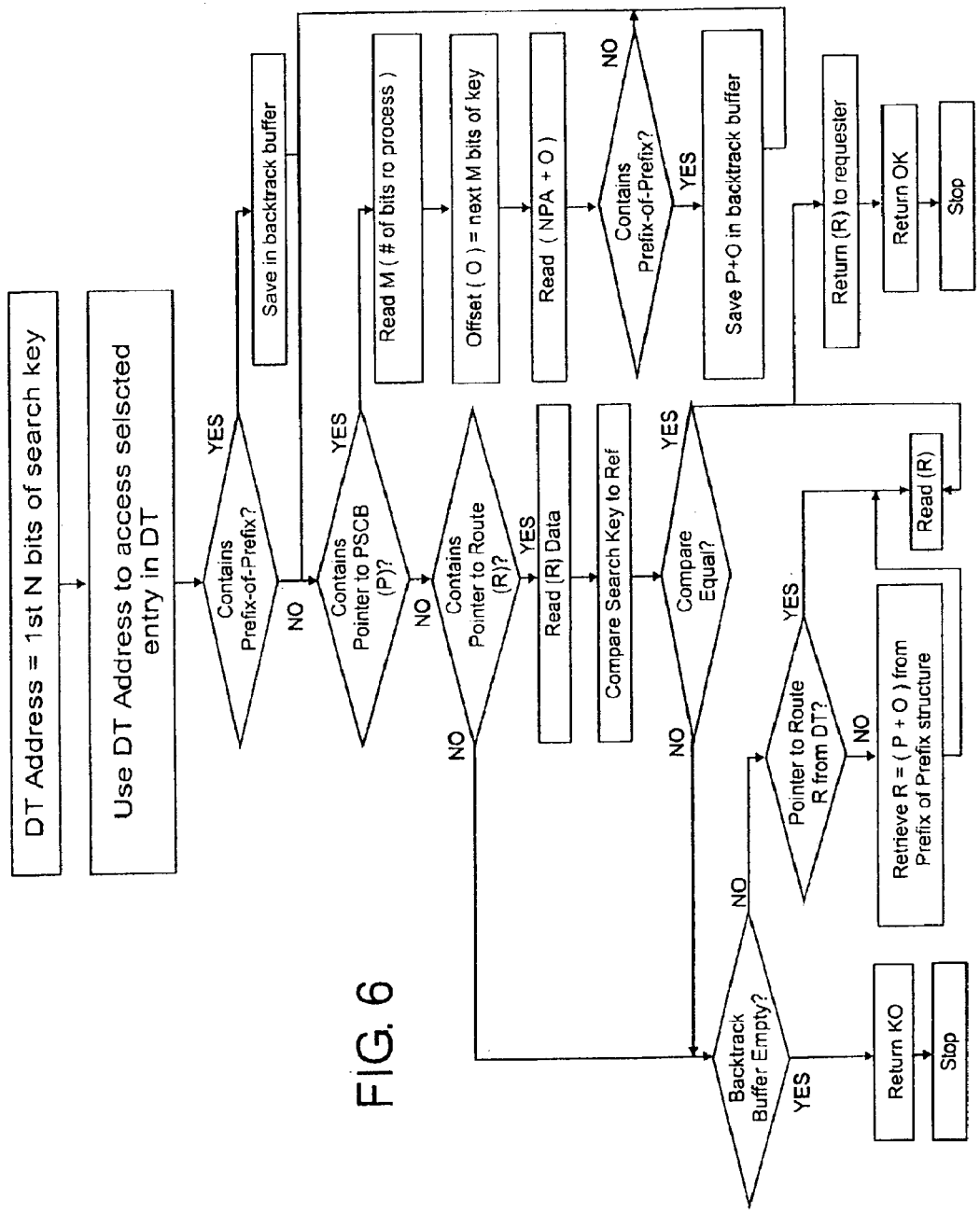
FIG. 6 is a flow diagram of the method of searching the tree of this invention.

FIG. 6 illustrates in detail the search procedure of the current invention. In response to a search request made by the network processor, the search engine of the current invention will use a search key of "n" bits provided by the requester to find a corresponding routing table entry. The search procedure enforces "Longest prefix match" (LPM) requirements commonly associated with routing table lookups (i.e., if multiple route prefixes in the table match the search requirements, the search will return the longest matching prefix).

After a pre-processing stage where requests may be queued up, and search parameters identified (i.e. base address of Direct Table 10, size of Direct Table ($2^X$), etc.), the search process starts by parsing the search key. The first X bits (in this case the first 16 bits) of the search key are used as an offset address into the Direct Table (DT) 10. Upon accessing the selected DT 10 entry, a determination is made of whether or not the entry contains a "prefix of a longer prefix". If it does point to a prefix of a longer prefix, i.e. it points to both a route and another PSCB, then this pointer to the route prefix is stored in a backtrack buffer. In either case, the procedure continues by examining the chain pointer field of the DT 10. A determination is made of whether or not this field contains a pointer to a Pattern Search Control Block (PSCB) 14. If it does, then the process must determine how many bits "m" to process at the next PSCB 14. The "next to test" "m" bits are retrieved from the search key and used as an offset from the pointer "P" to the base of the PSCB 14 to generate an address for the next PSCB 14 to fetch. Once the new PSCB 14 contents have been accessed, a determination is made whether or not a bit is set indicating a "prefix of a longer prefix" 16 at this level. If a prefix of a longer prefix 16 is indicated, the address used to read this PSCB 14 (i.e. P+O) is saved in the backtrack buffer. Note that this is different from the contents conditionally saved in the backtrack buffer during the processing of the DT 10 entry. The pointer saved from the DT 10 entry points directly to a routing table entry, while the pointer saved from a PSCB 14 address is used to retrieve from a different memory array a pointer to a routing table entry. Thus, the PSCB pointer, if used at the end of the search, requires an extra level of indirection. Whether or not a prefix of a longer prefix is indicated, the process continues by making a determination of whether or not the new PSCB 14 contains a pointer to another PSCB.

The steps described above repeat until the last PSCB in the chain is accessed indicated by an end of trail bit. Note that, as indicated above, the DT 10 entry may be the last link in the PSCB chain 12. At that point, a determination must be made of whether or not the chain pointer field contains a pointer (R) to a routing table entry. If it does, the contents of this routing table entry (R) are read, and a reference pattern in the table entry is compared to the search key to validate a match. The number of bits compared varies according to the length of the prefix in the route. If the compare is successful, the table entry contents (R) are returned to the requester, a result code of "OK" is returned to the requester, and the process terminates.

In the case where the compare is not successful, as well as the case where there is no pointer to a routing table entry or subsequent PSCB 14 (as determined in the previous decision block), the process continues by processing the contents of the backtrack buffer. In the case where nothing was previously stored in the backtrack buffer, in the case where no pointer was found to a routing table entry, or in the case where the bit position of mis-compare is lower than the bit position of the first entry in the backtrack buffer, a result code of "KO" is returned to the requester indicating that there is no route in the table matching the search criteria. Otherwise, an entry in the backtrack buffer is selected based on the first bit of mis-compare. (The entry with the longest prefix of matching bits is chosen.) If this entry was stored from the first access in the search (i.e. from the DT 10), it contains a pointer (R) to a routing table entry. In this case, the table entry contents (R) are returned to the requester, a result code of "OK" is returned to the requester, and the process terminates. Otherwise, the pointer P+O is used as an index into a second structure, dedicated to "prefixes of longer prefixes". In this case, the contents from the second structure, [P+O], are returned to the requester, a result code of "OK" is returned to the requester, and the process terminates. The requester must then use the returned contents from the second structure as a pointer to access the appropriate routing table entry by issuing a subsequent memory read. An alternate implementation could automatically use the pointer from the second structure to access the required routing table entry and return only the routing table entry to the user. In an additional implementation option, a frequently used pointer from the second structure could be cached in the corresponding PSCB 14 structure to facilitate this scenario. This option corresponds to the tree structure illustrated in FIG. 3 where each PSCB 14 has one additional entry 16r for use in caching these pointers for handling "prefixes of longer prefixes".

Figure 7:
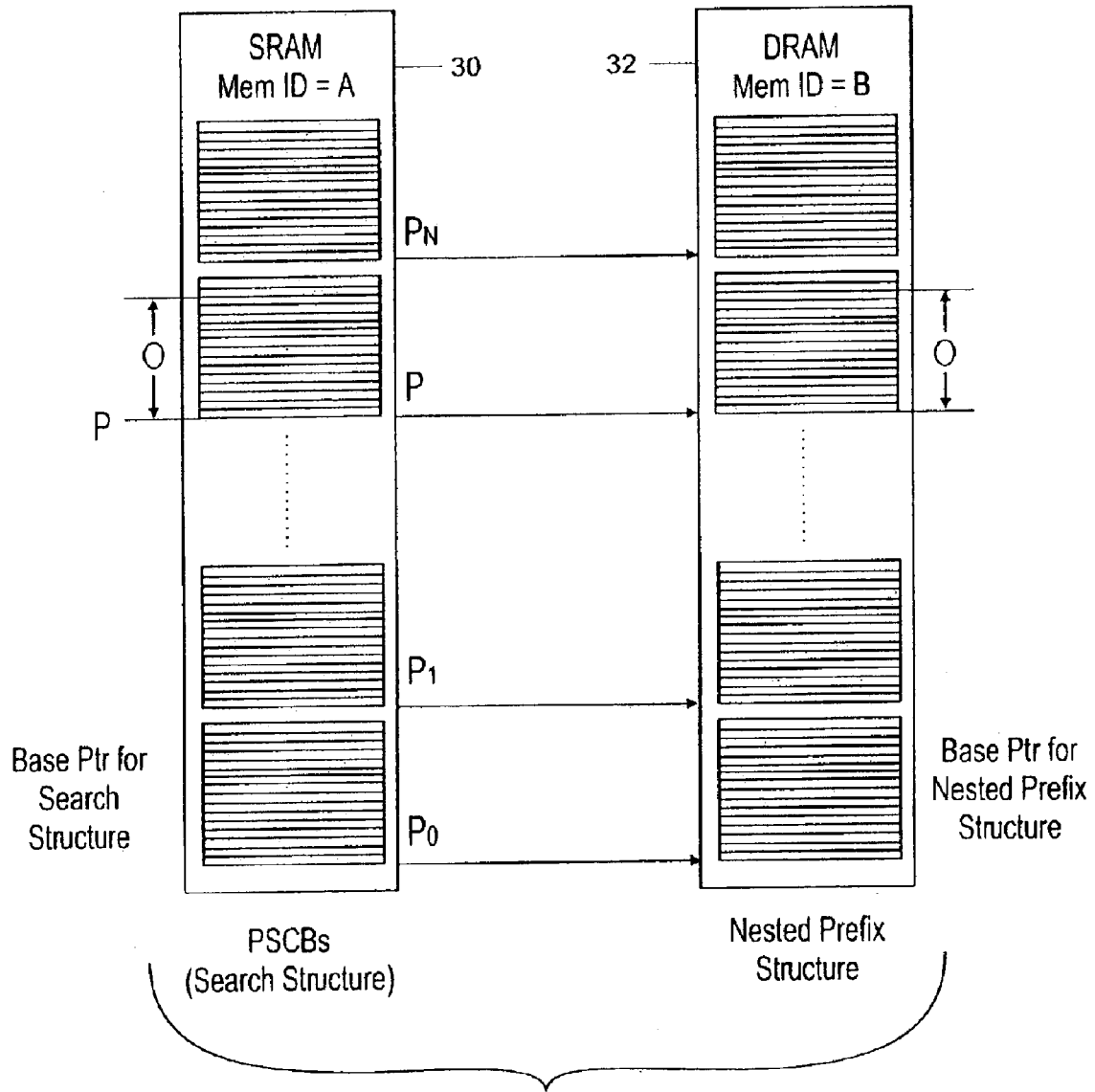
FIG. 7 is an illustration of the organization of nested-prefix structures relative to the PSCB structure according to this invention.

FIG. 7 illustrates the memory organization of the tree structure of the present invention. (It is to be understood, however, the memory organization of this invention could be associated with either a hardware or software programming implementation of the search algorithm.) SRAM memory 30 is used to store Pattern Search Control Blocks 14 (PSCBs) used during the search process. A pointer "P", provided from the DT 10 or previous PSCB 14, identifies a selected PSCB 14 structure, and the "m" bits from the search key that are being processed during the current iteration of the search algorithm are used directly as an offset "O" in the PSCB 14 structure. In the preferred embodiment, M=1 or M=4, resulting in a PSCB 14 structure with either 2 or 16 entries (2 M). Each entry in the PSCB 14 structure has one of two possible formats: FIG. 4b illustrates the format of an entry pointing to a subsequent PSCB 14, while FIG. 4c illustrates the format of an entry pointing to a table entry (i.e. route in a routing table). In the case where the entry points to a subsequent PSCB 14, bit 33 may be set to "1" to indicate the presence of a prefix of a prefix or a nested prefix at this node. As indicated in the search procedure of FIG. 6, a decision is made as to whether or not the selected PSCB entry contains a prefix of another prefix (i.e. a nested-prefix) by testing bit 33. If it is determined that a nested-prefix exists, the address of the PSCB "P" and the offset into the PSCB "O" are concatenated (P||O) and saved in the backtrack buffer. At the end of the search, a series of determinations is made as illustrated in the search procedure of FIG. 6. If the search key is not equal to the reference pattern in the table entry, then the entry is read from the backtrack buffer with the longest prefix length that is equal to or shorter than the least-significant bit of mis-compare. The entry of the backtrack buffer contains P||O from the corresponding search structure, and is used to point to a corresponding entry in the nested-prefix structure 18. The nested-prefix structure 18 may be in a different memory, and even a different type of memory. FIG. 7 illustrates use of DRAM 32 for the nested-prefix structure 18. Use of DRAM 32 may be advantageous since the cost of DRAM 32 is less than the equivalent amount of SRAM 30. Although access to DRAM 32 takes longer, most routing tables do not require frequent access to nested prefixes.

Alternate implementations can achieve higher search performance for nested prefixes by using a different SRAM or even another area within the same SRAM that contains the search structures. In fact, the search structures and nested prefix structures could be completely interleaved within the same memory. One feature of the invention is that the pointer "P" and offset "O" can be used to access both the search structure and the corresponding nested prefix structure by adding the appropriate memory ID and base pointer to the PSCB pointer "P" and offset "O". Thus, the complete address for either the search structure or the nested prefix structure would have a form of: {MemID||Base Ptr||P||O}. Note that if both structures have the same MemID, and the search structure Base Ptr=0 and the nested prefix structure Base Ptr=16, then the two structures are interleaved within the same memory.

Figure 8:
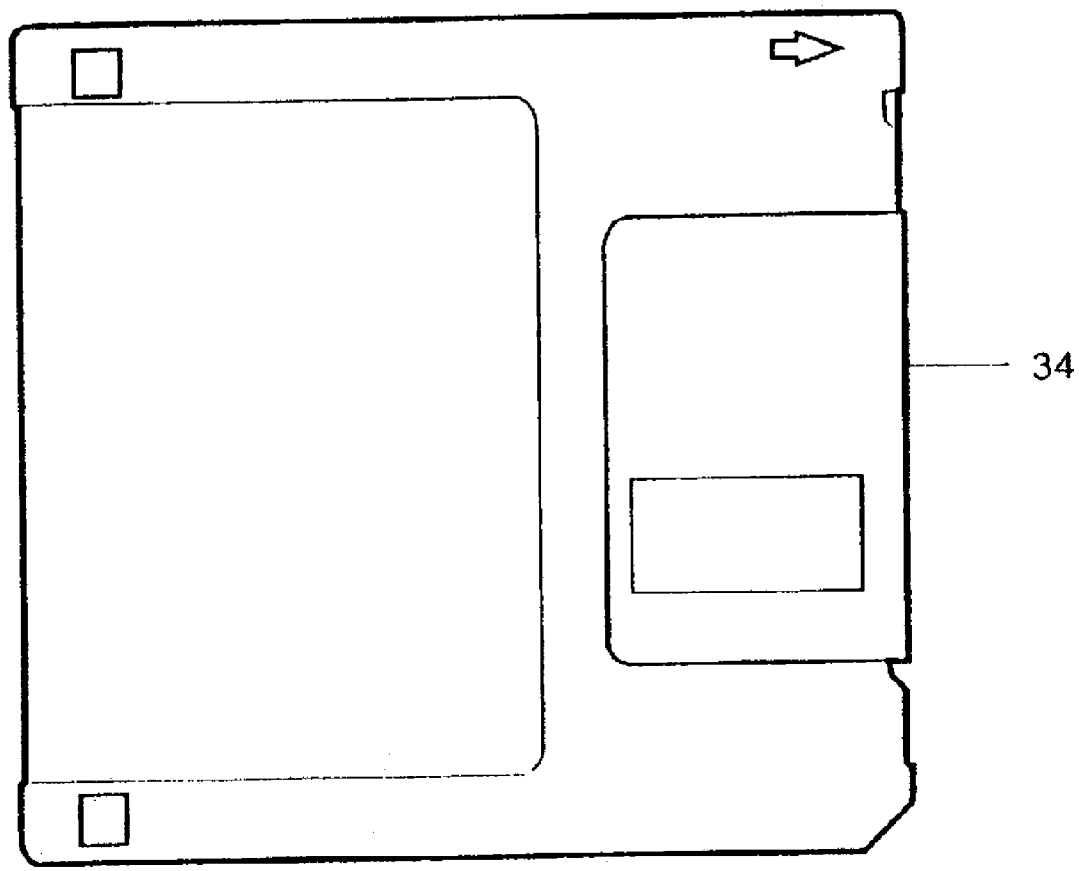
FIG. 8 is an illustration of a computer disc medium on which the program may be stored.

FIG. 8 shows, somewhat diagrammatically, a computer disc 34 for containing the software program of this invention.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A computer-implemented tree structure for organizing routing information to be used in processing messages within a network node, each message being associated with a search key "n" bits in length;

said processing including a determination of where to send the message next in order to get the message closer to the desired destination;

said structure comprising a direct table (DT) comprised of $2^x$ entries for decoding the first "x" bits of the search key;

one or more pattern search control blocks (PSCB's) comprised of $2^m$ entries for decoding subsequent groups of "m" bits;

each said PSCB entry and direct table entry including a pointer to data associated with a specific route, if at this point a specific routing table entry is a potential match to said search key;

each said PSCB entry and direct table entry including a pointer to a subsequent PSCB if the end of a search trail is not identified;

each said PSCB entry and direct table entry also including an indication if the search has been resolved to the end of the search trail;

means to walk through the tree structure to a trail end;

said tree structure including one or more search trails each starting at one of said entries in said direct table, continuing through zero or more PSCBs as guided by linked pointers, and ending at a PSCB or direct table entry containing an end of the search trail entry; and means to access data using a pointer in said PSCB containing an end of search trail entry and to return search results.

2. The apparatus of claim 1 wherein comparator means is provided to compare the searched key with the key stored in data pointed to by the PSCB or DT.

3. The apparatus as defined in claim 1 wherein a first at least one PSCB has provision for a pointer to a nested-prefix, and means to flag and search for said nested-prefix.

4. The apparatus as defined in claim 3 wherein an association is established between said first at least one PSCB having provision for a pointer to a nested-prefix and a second at least one PSCB without provision for a pointer to a nested-prefix.

5. The apparatus as defined in claim 4 wherein the second at least one PSCB has provision to receive and cache a pointer to a commonly used nested-prefix, and means to flag and search said cache, said pointer originating from said first at least one PSCB.

6. The apparatus as defined in claim 1 wherein said means for returning the search results include means to indicate either a validated search or a non-validated search result.

7. The apparatus as defined in claim 1 wherein "m" equals 4.

8. A computer-implemented method of routing a message comprising the steps of:

providing a tree structure for organizing routing information to be used in processing messages within a network node, each message being associated with a search key "n" bits in length;

said processing including a determination of where to send the message next in order to get the message closer to the desired destination;

said structure comprising a direct table (DT) comprised of $2^x$ entries for decoding the first "x" bits of the search key;

one or more pattern search control blocks (PSCB's) comprised of $2^m$ entries for decoding subsequent groups of "m" bits;

each said PSCB entry and direct table entry including a pointer to data associated with a specific route, if at this point a specific routing table entry is a potential match to said search key;

each said PSCB entry and direct table entry including a pointer to a subsequent PSCB if the end of a search trail is not identified;

each said PSCB entry and direct table entry also including an indication that the search has been resolved to the end of the search trail;

walking through the tree structure to a trail end;

sending the first "x" bits of said search key to said direct table for decoding;

if said direct table decodes said first "x" bits to provide a search trail end route, then routing said message on said decoded routing;

if said direct table does not indicate a search trail end route, then sending successive "n" bits to successive PSCB groups until a positive end search trail route is indicated;

storing the search trail information, and returning the search results.

9. The method of claim 8 wherein comparator means is provided to compare the searched key with the key stored in data pointed to by the PSCB.

10. The method as defined in claim 8 wherein a first at least one PSCB has provision for a pointer to a nested-prefix, and means to flag and search for said nested-prefix.

11. The method as defined in claim 10 wherein an association is established between said first at least one PSCB having provision for a pointer to a nested-prefix and a second at least one PSCB without provision for a pointer to a nested-prefix.

12. The method as defined in claim 11 wherein the second at least one PSCB has provision to receive and cache a pointer to a commonly used nested prefix, and means to flag and search said cache, said pointer originating from said first at least one PSCB.

13. The method as defined in claim 8 wherein "m" equals 4.

14. An article manufacture comprising a computer usable medium having a computer readable program embodied in said medium, wherein the computer readable program when executed on a computer causes the computer to:

provide a tree structure for organizing routing information to be used in processing messages within a network node, each message being associated with a search key "n" bits in length;

said processing including a determination of where to send the message next in order to get the message closer to the desired destination;

provide a structure comprising a direct table (DT) comprised of $2^x$ entries for decoding the first "x" bits of the search key;

one or more pattern search control blocks (PSCB's) comprised of $2^m$ entries for decoding subsequent groups of "m" bits;

each said PSCB entry and direct table entry including a pointer to data associated with a specific route, if at this point a specific routing table entry is a potential match to said search key;

each said PSCB entry and direct table entry including a pointer to a subsequent PSCB if the end of a search trail is not identified;

each said PSCB entry and direct table entry also including an indication that the search has been resolved to the end of the search trail;

sending the first "x" bits of said search key to said direct table for decoding;

if said direct table decodes said first "x" bits to provide a search trail end route, then routing said message on said decoded routing;

if said direct table does not indicate a search trail end route, then sending successive "n" bits to successive PSCB groups until a positive end search trail route is indicated;

storing the search trail information, and returning the search results.

* * * * *

UNITED STATES PATENT AND TRADEMARK OFFICE
CERTIFICATE OF CORRECTION

| | | |
|---|---|---|
| PATENT NO. | : 6,963,868 B2 | |
| APPLICATION NO. | : 10/448528 | |
| DATED | : November 8, 2005 | |
| INVENTOR(S) | : Claude Basso et al. | |

It is certified that error appears in the above-identified patent and that said Letters Patent is hereby corrected as shown below:

Add Title Page: the following publication under the References Cited, item (56), OTHER PUBLICATIONS heading on the title page of the patent:

IEEE 0-7803-6711-1, entitled "A Processor Based High-Speed Longest Prefix Match Search Engine", Kobayashi et al, 2001, Pages 233-239

Signed and Sealed this

Twentieth Day of May, 2008

JON W. DUDAS
*Director of the United States Patent and Trademark Office*